Figure 1:
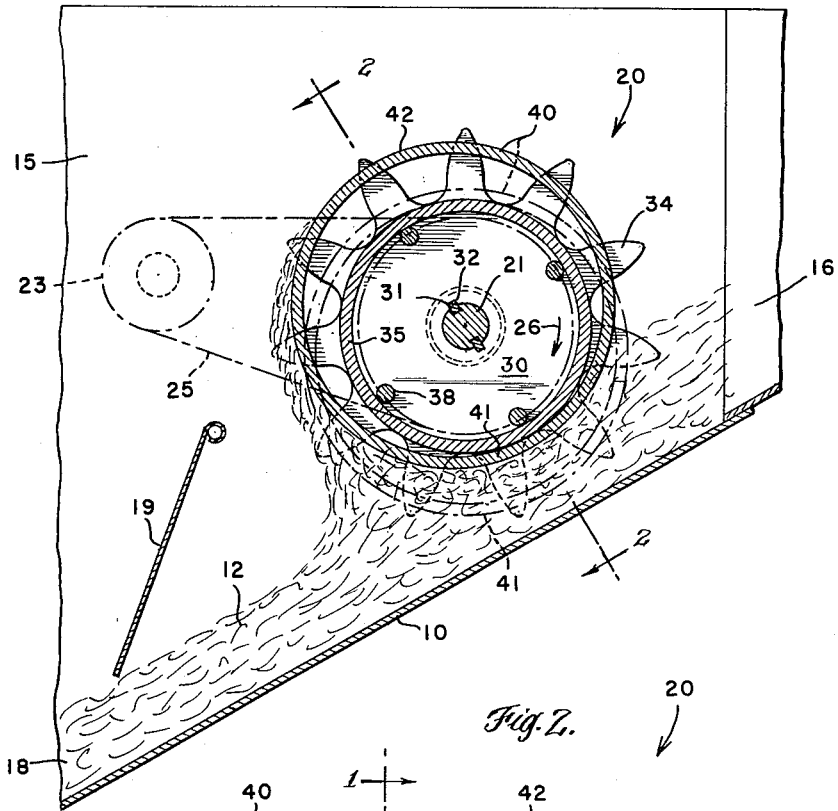

Dec. 22, 1964  M. L. SENSENIG  3,162,300
FEEDER

Filed May 21, 1963

INVENTOR.
MILES L. SENSENIG
BY
Joseph A. Brown
ATTORNEY

United States Patent Office 3,162,300
Patented Dec. 22, 1964

3,162,300
FEEDER
Miles L. Sensenig, Stevens, Pa., assignor to Sperry Rand Corporation, New Holland, Pa., a corporation of Delaware
Filed May 21, 1963, Ser. No. 282,033
8 Claims. (Cl. 198—211)

This invention relates generally to infeed conveyors and more particularly to a feeder for moving hay and other material along a supporting surface.

When a finger type rotatable feed roll is used to convey hay, there is a tendency for the hay to cling to the fingers and wrap around the roll. Some means is required to continuously strip material from the fingers to maintain the feed roll in operative condition. While there are various feed roll designs for achieving desired feeding objectives, such roll designs are commonly quite expensive to manufacture, assemble and repair. Further, some designs, even though expensive, do not achieve proper material stripping.

A main object of this invention is to provide a rotatable feeder having a design which is substantially simpler than those provided heretofore and being highly effective in stripping material from fingers of the feeder.

Another object of this invention is to provide a self-stripping feed roll design wherein the force of incoming material against the roll is used to produce a stripping action of material from roll fingers.

Another object of this invention is to provide a feed roll wherein the means for stripping material from roll teeth forms part of the roll structure.

A further object of this invention is to provide a feed roll of the character described which is designed with simple, rugged parts having long operative life without maintenance attention.

A still further object of this invention is to provide a feed roll which is inexpensive to manufacture, assemble and repair.

Other objects of this invention will be apparent hereinafter from the specification and from the recital in the appended claims.

Figure 2:
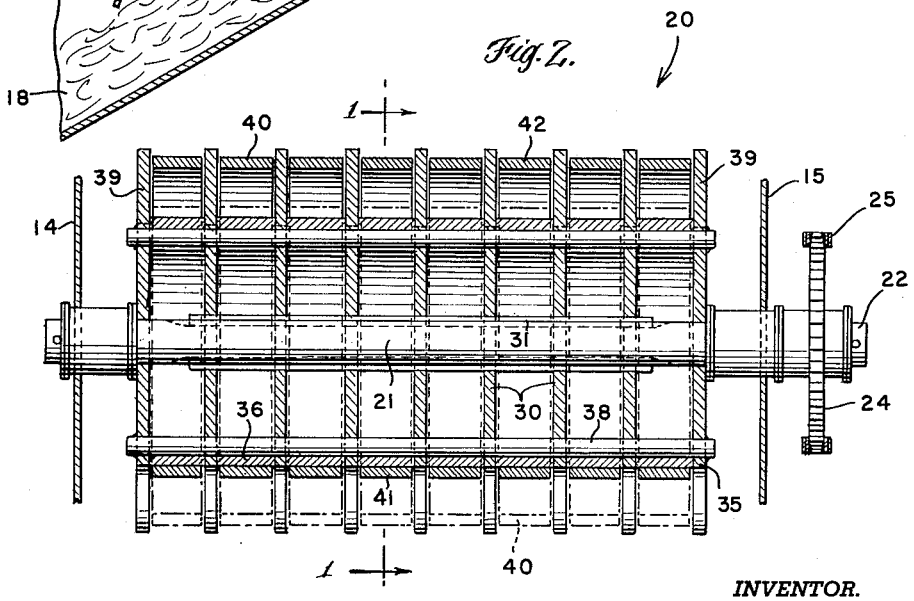

In the drawing:

FIG. 1 is a transverse vertical section taken on the line 1—1 of FIG. 2 looking in the direction of the arrows and showing a feeder constructed according to this invention; and FIG. 2 is a longitudinal generally vertical section taken on the line 2—2 of FIG. 1 looking in the direction of the arrows.

Referring now to the drawing by numerals of reference, 10 denotes a supporting surface over which hay 12 is adapted to be conveyed. The hay is intended to be moved between a pair of side walls 14 and 15 spaced from each other and providing a passageway. The hay 12 is admitted through an inlet at 16 and discharged through an outlet 18. A baffle is provided at 19 to limit the flow of material along surface 10.

For conveying the hay 12 delivered through inlet 16 and to discharge the hay toward outlet 18, a feeder 20 is provided. The feeder comprises a transverse shaft 21 which extends generally parallel to surface 10 and its ends are supported on the side walls 14 and 15. Shaft 21 has an end 22 which projects outwardly of the wall 15 and has a driven sprocket 24 mounted thereon. A chain 25 extends around sprocket 24 and around a drive sprocket 23 to provide a source of power for rotating shaft 21 in the direction indicated by the arrow 26 in FIG. 1.

Mounted on shaft 21 are disc plates 30 which extend in planes perpendicular to the axis of the shaft. The discs are uniformly axially spaced from each other and they are locked against angular movement relative to shaft 21 by keys 31 which project from the shaft and into notches 32 on the discs. Therefore, as the shaft 21 rotates, the discs rotate with it. Each disc has an annular set of radially outwardly extending teeth or feed fingers 34 which sweep downwardly across supporting surface 10.

Surrounding shaft 21 is a roll 35 formed by sleeves 36, there being one sleeve between each pair of adjacent discs 30. The sleeves 36 are maintained concentric to the axis of shaft 21 by rods 38 uniformly radially located relative to the shaft 21 and extending parallel thereto. The rods 38 extend through discs 30, and they are connected to the end discs 39 by welding or other means.

For stripping material from the fingers 34 of the discs 30, stripping rings 40 are provided. There is one stripping ring between each pair of discs 30. The rings 40 have a diameter larger than the diameter of the sleeves 36 of roll 35 but less than the diameter of the discs 30, including fingers 34. The rings have an axial dimension slightly less than the space between adjacent discs whereby the rings are loose and free to float radially relative to roll 35.

In operation, on rotation of feeder 20, the feed fingers 34 engage hay 12 and sweep it across supporting surface 10. The force of the incoming hay against the peripheries of rings 40 causes the rings to move in a radial direction away from the surface 10. As shown in FIG. 1, this causes portions 41 of the rings to be forced against the periphery of roll 35 while other portions 42 of the rings are moved radially outwardly of the roll to exert a stripping action on adjacent disc teeth 34. As successive angular portions of the roll move toward supporting surface 10 responsive to rotation of the roll, the force of the hay against the rings causes them to maintain a position eccentric to the axis of shaft 21. Thus, the teeth 34 which sweep downwardly and into the hay exert a strong feeding action on the material while at the same time the teeth which are in return travel have the hay stripped therefrom by the portions 42 of the rings 40.

It is thus seen that feeder 20 is self-stripping and that the rings 40 which strip the hay are part of the roll structure. The overall arrangement is outstandingly simple. Nevertheless, a very aggressive stripping action is obtained utilizing the force of the incoming material being engaged by roll 35. No supplementary power means is required or utilized for the stripping action.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A self-stripping feeder for moving hay and other material, comprising a rotatable roll, a plurality of teeth projecting radially from said roll, and a loose ring surrounding said roll and extending alongside said teeth, said ring being supported by the roll and having a diameter greater than the diameter of the roll whereby the ring axis may move in a radial direction relative to the roll responsive to engagement of material with the ring.

2. A self-stripping feeder for moving hay and other material, comprising a rotatable roll, a plurality of teeth projecting radially from said roll and engageable with material on said surface, said teeth being arranged in annular sets axially spaced from each other, and a plurality of loose rings surrounding said roll, there being at least one ring between adjacent sets of teeth, said rings being supported by the roll and having a diameter greater than the diameter of the roll whereby the axes of the rings may move in a radial direction relative to the roll by engagement of material with the rings.

3. A self-stripping feeder for moving hay and other material, comprising a rotatable roll, a plurality of discs mounted on said roll and extending in planes perpendicular to the axis of the roll, said discs being axially spaced from each other and having radially projecting angularly spaced teeth, a plurality of loose rings surrounding said roll and supported thereon, there being at least one ring between the teeth of two adjoining discs, said rings having a diameter greater than the diameter of the roll whereby their axes may move in a radial direction relative to the roll responsive to engagement of material with the rings to thereby strip material from said teeth.

4. A self-stripping feeder as recited in claim 3 wherein said discs are all of the same configuration and the spacing between the discs being uniform.

5. A self-stripping feeder as recited in claim 4 wherein said rings have a diameter less than the diameter of each disc including the teeth thereon and each ring having an axial dimension substantially filling the space between adjacent discs.

6. A self-stripping feeder for moving hay and other material along a supporting surface, comprising a rotatable shaft extending generally parallel to said surface, a plurality of discs mounted on said shaft and uniformly axially spaced from each other, means connecting said discs to said shaft for rotation therewith, said discs extending in planes perpendicular to said shaft and having radially outwardly projecting teeth, a roll formed by a plurality of sleeves surrounding said shaft and there being one sleeve between each adjoining pair of discs, means holding said sleeves in concentric relation to said shaft, and a plurality of loose rings surrounding said roll and supported thereby, there being one ring for each sleeve, said rings having an axial dimension substantially filling the space between adjacent discs and having a diameter greater than the diameter of said roll whereby the axes of the rings may move in a radial direction relative to said shaft responsive to engagement of material with the peripheries of the rings, the radial movement of the rings serving to strip material from said teeth.

7. A self-stripping feeder as recited in claim 6 wherein said sleeve holding means comprises a plurality of angularly spaced rods uniformly radially located relative to said shaft extending parallel to the shaft axis, said rods engaging the insides of the sleeves and having ends connected to the end discs of said plurality of discs.

8. A self-stripping feeder as recited in claim 7 wherein said means connecting said discs to said shaft comprises a key on the shaft projecting into a notch in each disc.

References Cited by the Examiner

FOREIGN PATENTS 566,009   12/32   Germany.

SAMUEL F. COLEMAN, *Primary Examiner.*
WILLIAM B. LA BORDE, *Examiner.*